H. OSBORNE.
MEANS FOR REGULATING THE SPEED OF DIRECT CURRENT MOTORS.
APPLICATION FILED NOV. 8, 1912.
1,060,208.
Patented Apr. 29, 1913.
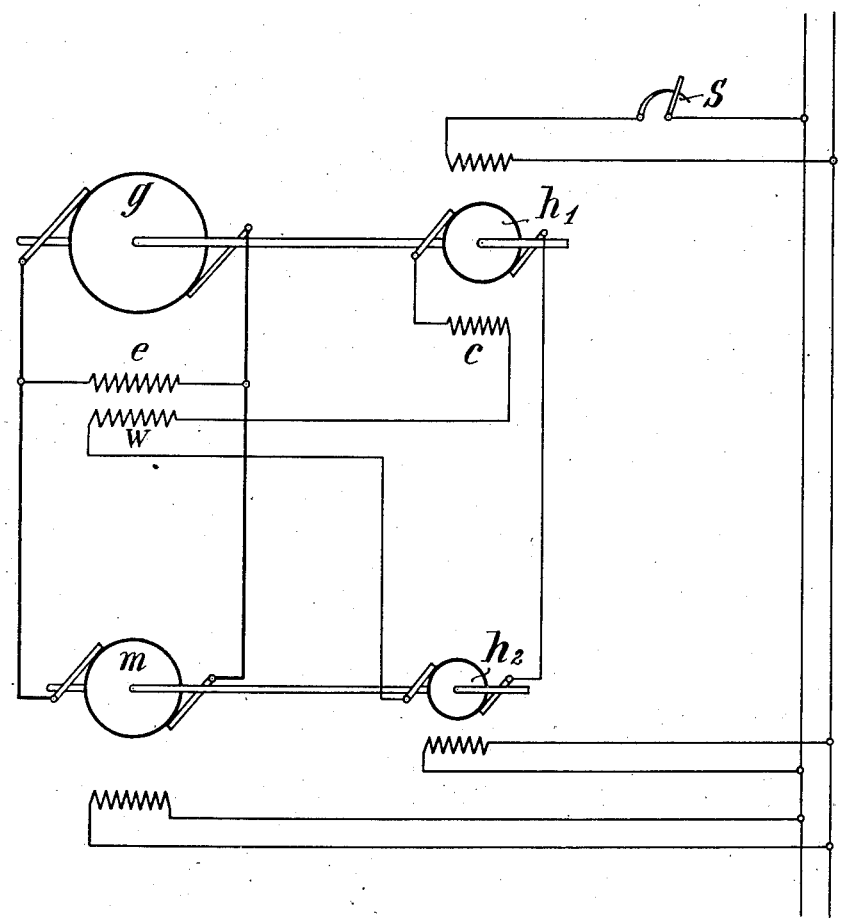

UNITED STATES PATENT OFFICE.

HEINRICH OSBORNE, OF CHARLOTTENBURG, GERMANY, ASSIGNOR TO SIEMENS-SCHUCKERT WERKE, G. M. B. H., OF BERLIN, GERMANY, A CORPORATION OF GERMANY.

MEANS FOR REGULATING THE SPEED OF DIRECT-CURRENT MOTORS.

1,060,208.  Specification of Letters Patent.  Patented Apr. 29, 1913.

Application filed November 8, 1912. Serial No. 730,207.

*To all whom it may concern:*

Be it known that I, HEINRICH OSBORNE, a citizen of the Austro-Hungarian Empire, and residing at Charlottenburg, near Berlin, Germany, have invented certain new and useful Improvements in Means for Regulating the Speed of Direct-Current Motors, of which the following is a specification.

My invention relates to improved means for regulating the speed of direct-current motors and has special reference to the well-known Ward-Leonard connection.

When it is desired to regulate the speed of electrical machines with certainty, it should be possible to obtain speeds which have predetermined values depending absolutely on the position of the arm of the regulating switch. In the known Ward-Leonard system wherein a direct current motor having a constant field is supplied at varying voltages from a special regulating generator, the above-named condition is only approximately obtained, because the loss of potential due to ohmic resistance in all the leads and the remanence of the magnetic fields, especially at low speeds of the motor, cause the speeds obtained to vary considerably from their predetermined values.

A primary object of my invention is to obviate this defect, and to this end I provide means whereby it is possible to obtain speeds of the motor which have values which do not appreciably vary from predetermined values depending upon the position of the arm of the regulating switch. With the same object in view, a number of methods are already known wherein these variations from the predetermined values of the speeds have been more or less reduced by employing a special auxiliary dynamo. According to my invention, I employ auxiliary machines which coöperate both with the auxiliary regulating dynamo and the main motor, and the said variations are thus entirely dispensed with.

One illustrative embodiment of my invention is diagrammatically represented by way of example in the accompanying drawing.

The regulating generator $g$ is employed to supply current at varying voltages to the motor $m$, as in the known Ward-Leonard system. The exciting winding $w$ of the said generator is however energized by two auxiliary machines $h_1$, $h_2$ connected in series, but arranged to generate voltages counter to each other. The circuit so formed will be called the auxiliary machine circuit. The auxiliary machine $h_2$ is driven by the working motor $m$ in such manner that it has a speed proportional to that of the motor. The other auxiliary machine $h_1$ can be coupled mechanically with the regulating generator. It is however preferable that the machine $h_1$ be coupled with a special constant-speed motor in order that it may be independent of changes in speed of the generator $g$, for this speed in some cases, e. g. in the known Ilgner system, may vary within certain limits.

Both the motor $m$ and the auxiliary machine $h_2$ are separately excited with as constant an excitation as possible, and the auxiliary machine $h_1$ receives an excitation dependent upon the adjustment of the regulating switch $s$. The regulating generator $g$ can have not only an exciting winding in the auxiliary machine circuit as already stated, but also an additional exciting winding which may be either a self-exciting winding $e$ or a winding supplied from a separate source. The auxiliary machine $h_1$ is preferably provided with a compound winding $c$.

My improved system of regulation operates in the following manner:—As soon as the separately excited winding of machine $h_1$ receives current, the latter generates a current energizing the winding $w$ of the regulating dynamo, which therefore generates a voltage. The motor $m$ and consequently the auxiliary machine $h_2$ will therefore begin to rotate. The lower the speed of the motor, the greater will be the difference of voltage between the two auxiliary machines and consequently the greater the excitation of the regulating dynamo. The motor $m$ thus always tends to acquire a speed determined by the position of the regulating switch $s$. With an increase in the motor speed the current in the auxiliary circuit falls until the motor speed has attained the value which corresponds to that field strength given by the winding $n$ which is just requisite to produce the correct voltage in the generator $g$. Should the speed of the motor vary for any reason such as owing to change of load and so on, there is a simultaneous change in the voltage of the auxiliary machine $h_2$, and this causes a considerable increase or diminution in the current in the exciting winding of the generator, the effect lasting until the motor has again come to its proper speed. To compensate for the effect of ohmic resistance in the auxiliary machine circuit, and so avoid a certain difference of voltage in the auxiliary machine circuit which would depend solely upon the current in this circuit, and to thus avoid the speed of the motor being changed in the same degree, the auxiliary machine $h_1$ is preferably compounded, as is shown in the drawing. Any desired strength of current could then be employed in the auxiliary machine circuit, such current being independent of the adjustment of the regulator $s$. The particular current values employed are however always so influenced by the change of voltage of the auxiliary machine $h_2$ that a value results which is just sufficient to excite the dynamo to give the exact desired motor speed. As the strength of current in the auxiliary circuit is thus neither dependent on the speed nor on the separate excitation of the auxiliary machine $h_1$, it is possible to reduce it to such an extent that the regulating dynamo receives an additional excitation either from a separate source, or from a self-exciting winding $e$. The current in the winding $w$ is then only that required to supply the difference between the excitation needed to give the correct speed to the motor and the excitation due to the coil $e$. By adopting this arrangement much smaller auxiliary machines can be employed.

I claim:—

1. In means for regulating the speed of a direct-current motor, the combination with a separately excited motor and a generator energizing said motor and having a field winding, of two auxiliary dynamos, the first having a regulatable field, and the second being separately excited and mechanically connected to said motor, the said auxiliary dynamos being connected counter to one another, and thus energizing said field winding.

2. In means for regulating the speed of a direct-current motor, the combination with a separately excited motor and a generator energizing said motor and having a field winding, of two auxiliary dynamos, the first having a regulatable field, and the second being separately excited and mechanically connected to said motor, the said auxiliary dynamos being connected counter to one another, and being in series with a portion of said field winding, the remainder of said field winding being fed from a separate source.

3. In means for regulating the speed of a direct-current motor, the combination with a separately excited motor and a generator energizing said motor and having a field winding, of two auxiliary dynamos, the first having a regulatable field, and the second being separately excited and mechanically connected to said motor, the said auxiliary dynamos being connected counter to one another, and being in series with a portion of said field winding, the remainder of said field winding being a self-exciting winding.

4. In means for regulating the speed of a direct-current motor, the combination with a separately excited motor and a generator energizing said motor and having a field winding, of two auxiliary dynamos, the first being compounded and having a regulatable field, and the second being separately excited and mechanically connected to said motor, the said auxiliary dynamos being connected counter to one another, and thus energizing said field winding.

5. In means for regulating the speed of a direct-current motor, the combination with a separately excited motor and a generator energizing said motor and having a field winding, of two auxiliary dynamos, the first having a regulatable field and being driven at constant speed and the second being separately excited and mechanically connected to said motor, the said auxiliary dynamos being connected counter to one another, and thus energizing said field winding.

In testimony whereof, I have signed my name to this specification in the presence of two witnesses.

HEINRICH OSBORNE.

Witnesses:
 WOLDEMAR HAUPT,
 HENRY HASPER.